(12) United States Patent
Koran

(10) Patent No.: US 7,844,605 B2
(45) Date of Patent: Nov. 30, 2010

(54) USING NATURAL SEARCH CLICK EVENTS TO OPTIMIZE ONLINE ADVERTISING CAMPAIGNS

(75) Inventor: Joshua M. Koran, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 782 days.

(21) Appl. No.: 11/738,195

(22) Filed: Apr. 20, 2007

(65) Prior Publication Data

US 2008/0263025 A1 Oct. 23, 2008

(51) Int. Cl.
*G06F 17/30* (2006.01)
*G06Q 30/00* (2006.01)

(52) U.S. Cl. .................... 707/732; 705/14.54
(58) Field of Classification Search ........... None
See application file for complete search history.

(56) References Cited

U.S. PATENT DOCUMENTS

| | | | |
|---|---|---|---|
| 6,041,326 A | 3/2000 | Amro et al. | |
| 6,314,420 B1 | 11/2001 | Lang et al. | |
| 6,397,212 B1 | 5/2002 | Biffar | |
| 6,490,579 B1 | 12/2002 | Gao et al. | |
| 6,801,909 B2 * | 10/2004 | Delgado et al. | 707/4 |
| 6,850,934 B2 | 2/2005 | Bates et al. | |
| 6,898,592 B2 | 5/2005 | Peltonen et al. | |
| 6,999,959 B1 | 2/2006 | Lawrence et al. | |
| 7,072,888 B1 | 7/2006 | Perkins | |
| 7,107,261 B2 | 9/2006 | Farrett | |
| 7,386,572 B2 * | 6/2008 | Kramer | 707/104.1 |
| 7,725,464 B2 * | 5/2010 | Grubb et al. | 707/723 |
| 2002/0052873 A1 * | 5/2002 | Delgado et al. | 707/7 |
| 2004/0267700 A1 * | 12/2004 | Dumais et al. | 707/2 |
| 2004/0267730 A1 * | 12/2004 | Dumais et al. | 707/3 |
| 2005/0131884 A1 | 6/2005 | Gross et al. | |
| 2005/0234895 A1 * | 10/2005 | Kramer | 707/3 |
| 2006/0069617 A1 * | 3/2006 | Milener et al. | 705/14 |
| 2007/0011039 A1 * | 1/2007 | Oddo | 705/10 |
| 2007/0061363 A1 * | 3/2007 | Ramer et al. | 707/104.1 |
| 2007/0150353 A1 * | 6/2007 | Krassner et al. | 705/14 |

(Continued)

FOREIGN PATENT DOCUMENTS

WO  WO 2007/025130 A2  3/2007

(Continued)

*Primary Examiner*—Pierre M Vital
*Assistant Examiner*—Christopher P Nofal
(74) *Attorney, Agent, or Firm*—Nathan O. Greene; Brinks Hofer Gilson & Lione

(57) ABSTRACT

A method is described for augmenting sponsored search results in a search engine, which includes extracting attribute data from a plurality of natural searches for a search term linked to a plurality of uniform resource locators (URLs), analyzing the attribute data of one or more attributes for clickers and non-clickers to determine at least one greatest distinguishing factor between the clickers and non-clickers, and integrating the at least one greatest distinguishing factor into a matching algorithm used by the search engine to rank order and display a plurality of the most relevant ads corresponding to the plurality of URLs in response to a search for the term. The method may also integrate the at least one greatest distinguishing factor into a marketer algorithm to enable a marketer of a URL to strategically choose a search term, along with the at least one greatest distinguishing factor, on which to bid.

23 Claims, 7 Drawing Sheets

U.S. PATENT DOCUMENTS

| | | | |
|---|---|---|---|
| 2007/0192164 A1* | 8/2007 | Nong et al. | 705/10 |
| 2007/0214050 A1* | 9/2007 | Schoen et al. | 705/14 |
| 2007/0260597 A1* | 11/2007 | Cramer | 707/5 |
| 2007/0260624 A1* | 11/2007 | Chung et al. | 707/101 |
| 2008/0059258 A1* | 3/2008 | Lee | 705/7 |
| 2008/0183558 A1* | 7/2008 | Koran | 705/10 |
| 2008/0228571 A1* | 9/2008 | Koran | 705/14 |
| 2008/0250033 A1* | 10/2008 | Agarwal et al. | 707/100 |
| 2009/0106100 A1* | 4/2009 | Mashinsky | 705/14 |
| 2009/0193014 A1* | 7/2009 | Menezes et al. | 707/5 |
| 2009/0228353 A1* | 9/2009 | Achan et al. | 705/14 |
| 2009/0287682 A1* | 11/2009 | Fujioka et al. | 707/5 |
| 2010/0106703 A1* | 4/2010 | Cramer | 707/706 |
| 2010/0169175 A1* | 7/2010 | Koran | 705/14.45 |

FOREIGN PATENT DOCUMENTS

| | | |
|---|---|---|
| WO | WO 2007/025338 A1 | 3/2007 |

\* cited by examiner

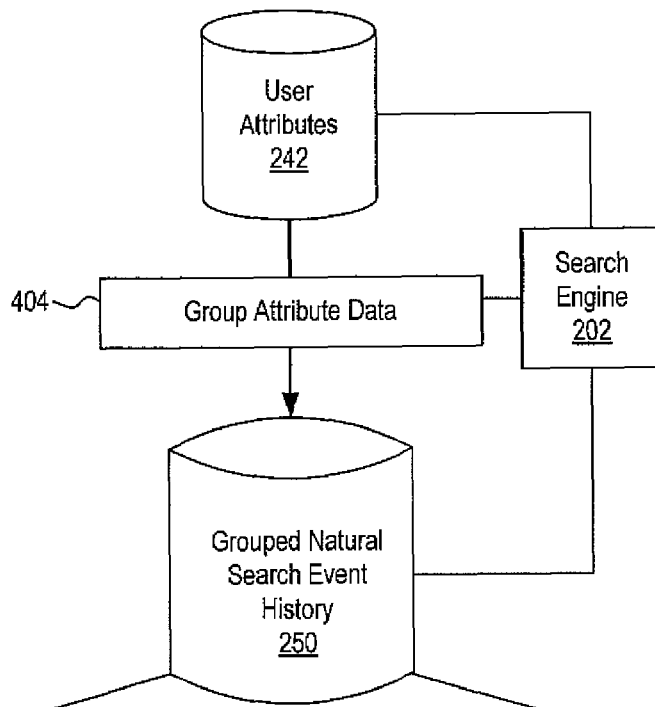

400

404 — Group Attribute Data

User Attributes 242

Search Engine 202

Grouped Natural Search Event History 250

316 — 1. independent attribute data (compiled from aggregates in User Attributes Database 242)
User Geographies
User Technographics
User Demographic
User Purchasing History 420 — 2. overlapping combinations of attributes, for example:
a State & a Gender
a State & a Gender & Sports
a large U.S. City & a Race
a Technographic & a Demographic
a Demographic & a Purchasing History
an Age & a Technographic 424 — 3. non-overlapping combinations of attributes, for example:
Males in a State & Females in a State
Hispanics in Alaska & Hispanics in Florida
Males in Europe & Males in the U.S.

FIG. 4

USING NATURAL SEARCH CLICK EVENTS TO OPTIMIZE ONLINE ADVERTISING CAMPAIGNS

BACKGROUND

1. Technical Field

The disclosed embodiments relate to a system and methods for augmenting, and thus enhancing, sponsored search results in a search engine with natural search click events.

2. Related Art

Pay-per-click sponsored search terms are typically listed at the top of a list of search engine results when users search on such terms. Attached to the search terms are the Uniform Resource Locators (URL) links, which a searcher may click to go to marketers' web pages to further search a given result. The history of those who search for pay-per-click terms is usually well tracked because advertisers or marketers who pay for the terms want to be able to track click-through rates of these terms according to their target markets. This is known as optimizing online campaigns based on past success rates of sponsored search terms.

Click-through rates may be tracked for not only sponsored terms, but also for non-sponsored terms (e.g., unpaid listings), in which the latter creates natural search click events. While clicks on URLs within a set of search results can be directly tracked by a search engine, clicks after a searcher is at a marketer's website may further be tracked by using an invisible pixel tag or "web beacon" on a marketer's web page. A web beacon (also referred to as a web bug) is a piece of software code, which is invisible to a web searcher that pings back to a search engine server to close the loop and report on the extent to which a searcher uses a web page, up to and including purchasing activity. Information gathered may also include who is reading the web page and from what computer. Though many search engine or search term sponsoring companies collect natural search event information, they have done very little with the information in terms of enhancing marketing campaigns or providing searchers with more relevant results. One reason for this outcome is that the information is not directly linked to paid-for search terms. Also, the amount of natural search event information is so voluminous, it is often difficult to process or make sense of the information in a useful, cost-effective way.

SUMMARY

By way of introduction, the embodiments described below include a system and methods for augmenting and enhancing sponsored search results in a search engine with natural search click events.

In a first aspect, a method is disclosed for augmenting sponsored search results in a search engine, which includes extracting attribute data from a plurality of natural searches for a search term linked to a plurality of uniform resource locators (URLs), analyzing the attribute data of one or more attributes for both clickers and non-clickers to determine at least one greatest distinguishing factor between the clickers and non-clickers for the one or more attributes, and integrating the at least one greatest distinguishing factor into a matching algorithm used by the search engine to rank order and display a plurality of the most relevant ads corresponding to the plurality of URLs in response to a search for the term. The method may further include integrating the at least one greatest distinguishing factor into a marketer algorithm used by the search engine to enable a marketer of a URL to strategically choose a search term, along with the at least one greatest distinguishing factor, on which to bid.

In a second aspect, a method is disclosed for augmenting sponsored search results in a search engine, which includes extracting attribute data from a plurality of natural searches for a search term associated with a plurality of URLs, analyzing the data of a plurality of attributes for both clickers and non-clickers to determine at least one attribute that differentiates clickers from non-clickers, grouping the clickers into segments based on the at least one differentiating attribute, and calculating relative click-through rates of each segment to be associated therewith.

In a third aspect, a method is disclosed for augmenting sponsored search results in a search engine, which includes extracting attribute data from a plurality of natural searches for search terms linked to a plurality of URLS, associating the attribute data in memory with the specific users that conducted the natural searches, executing a targeting algorithm that incorporates the associated attribute data for a user performing a search for a search term, and re-ranking a set of URL results based on the executed targeting algorithm before being displayed to the user.

In a fourth aspect, a system is disclosed for augmenting sponsored search results in a search engine, which includes an index manager to extract attribute data from a plurality of natural searches performed by a search engine for a search term linked to a plurality of URLs. A database is in communication with the index manager to store the extracted attribute data, in which the database comprises user attributes associated in memory with specific users that performed the natural searches and the aggregates of the user attributes grouped by type of attribute. A processor is in communication with the database to perform a method, which includes analyzing the aggregates of the user attributes for both clickers and non-clickers to determine at least one attribute that differentiates clickers from non-clickers, grouping the clickers into one or more segments based on the at least one differentiating attribute, and storing the grouped segments in the database.

A matching algorithm in memory of the search engine may integrate the at least one differentiating attribute to rank order and display the most relevant URL or ad results in response to a search for the term. A marketer algorithm in memory of the search engine may integrate the at least one differentiating attribute to enable a marketer of at least one URL to choose a strategic search term, along with the at least one differentiating attribute, on which to bid. A targeting algorithm in memory of the search engine may integrate the associated attribute data for an identified user performing a search for a search term, wherein when the targeting algorithm is executed, the targeting algorithm re-ranks a set of URL results before being displayed to the identified user. In the various embodiments, attribute data may include user geography, a user technographic, a user demographic, and a user purchasing history, among others.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like-referenced numerals designate corresponding parts throughout the different views.

FIG. 4 is an exemplary block diagram showing another aspect of the search engine of FIG. 2, which is capable of grouping the extracted attribute data (FIG. 3) into segments by overlapping and by non-overlapping combinations of attribute categories.

DETAILED DESCRIPTION

In the following description, numerous specific details of programming, software modules, user selections, network transactions, database queries, database structures, etc., are provided for a thorough understanding of various embodiments of the systems and methods disclosed herein. However, the system and methods disclosed can be practiced without one or more of the specific details, or can be practiced with other methods, components, materials, etc.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the embodiments disclosed may be changed as would be apparent to those skilled in the art. Thus, any order in the Figures or Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
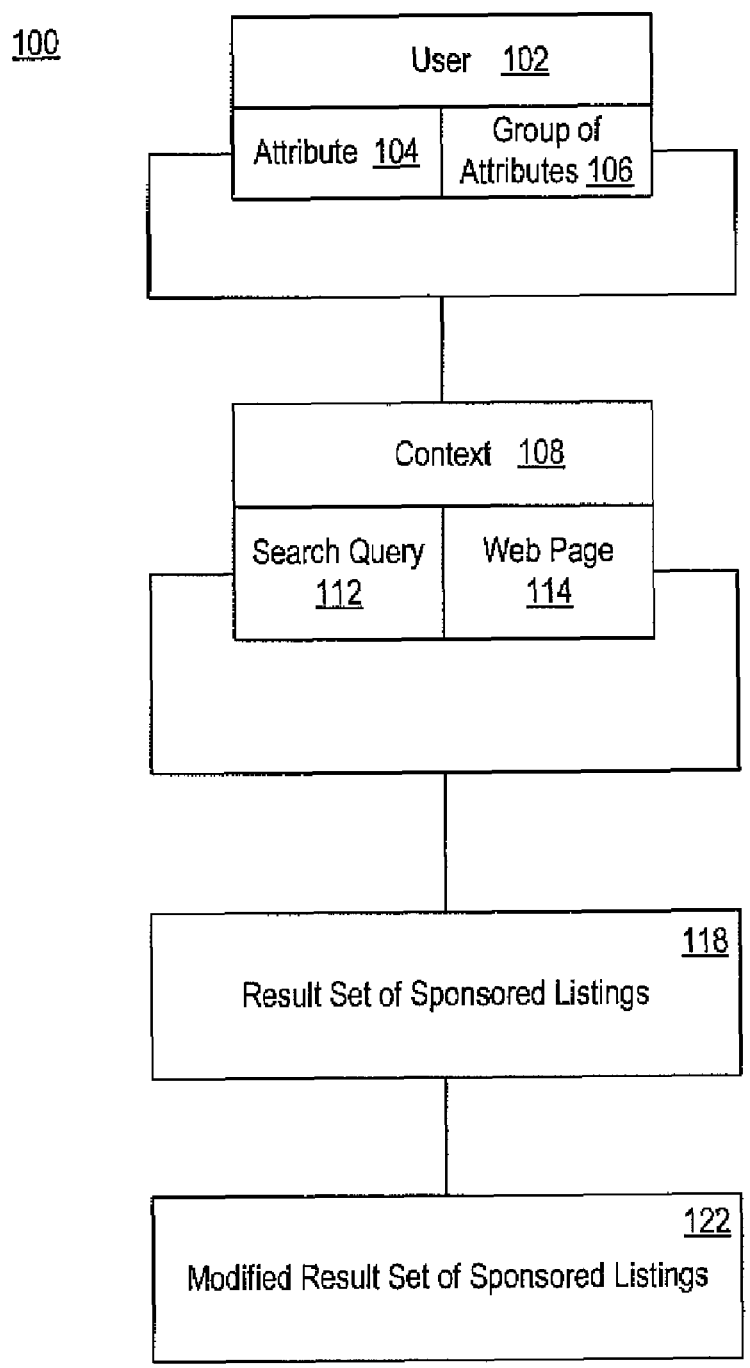
FIG. 1 is a diagram of an exemplary system for augmenting marketing campaigns with natural search events.

FIG. 1 is a diagram of an exemplary system 100 for augmenting marketing campaigns with natural search events. As discussed above, a plurality of users 102 (variably referred to herein as searchers 102) include millions of people throughout the world who use the Internet, or World Wide Web, to browse for information, many of whom also shop online. As users 102 browse, their activity may be tracked through search engine queries and web beacons or the like as discussed above, which activity generates a large volume of natural search event information, in addition to sponsored search term activity. The natural search event information may be broken down into user attributes 104 or group of attributes 106 by categories, such as geography, technographics (the technical specifications of the computer systems used by users 102), demographics, and purchasing history, to name just a few.

Marketers have difficulty determining which targeting attributes 104 to use to achieve any particular marketing goal, especially where they have relied solely on paid-for terms to attract visitors. If they have a given publisher's target market information from the past, marketers can analyze the results of the permutations and then decide which targeting attributes 104 (e.g., location, user attributes 104, context, etc.) worked best for any given advertising content. If they have not used a given targeting attribute 104 of that particular publisher, marketers are unable to predict if the price-premium is worth using that attribute 104. Moreover, focusing solely on the attributes 104 of past campaigns leads to reinforcement of inefficient choices. For example, if a marketer has only targeted males in the past, no analysis would be able to predict the expected performance of targeting females.

The attributes 104 may be gathered in various contexts 108 by conducting search queries 112, by browsing web pages (or websites) 114, or by any other method known in the art for gathering natural search event information of searchers 102. User attributes 104 may be independent or in either overlapping or non-overlapping combinations. When a search query 112 is conducted, the user 102 obtains a result set 118 of marketer listings from a publisher's search engine. The system and methods of the present disclosure may then be used to produce a modified result set 122 of sponsored listings incorporating the natural search event information collected from search queries 112 and browsed web pages 114, etc.

The modified result set 122 will likely include re-ranking the search results listed due to modifications made by a sponsored-listing search engine to a matching algorithm. Other algorithms, such as a targeting algorithm, may also be modified to incorporate natural search information stored and tracked for specific users that may be used to match such users with a modified set of results in which the user would be more likely to be interested. Yet further algorithms, such as a marketer algorithm, may be modified to incorporate general pools of natural search information that can be used to suggest or recommend to marketers various keywords on which to bid, e.g. keywords that best match their target market and/or advertising campaign strategies. Helping marketers on the one hand and modifying result sets 122 on the other allows this disclosure to be implemented into existing technologies in a way that augments marketers' campaign strategies and enhances the relevancy of user results.

Figure 2:
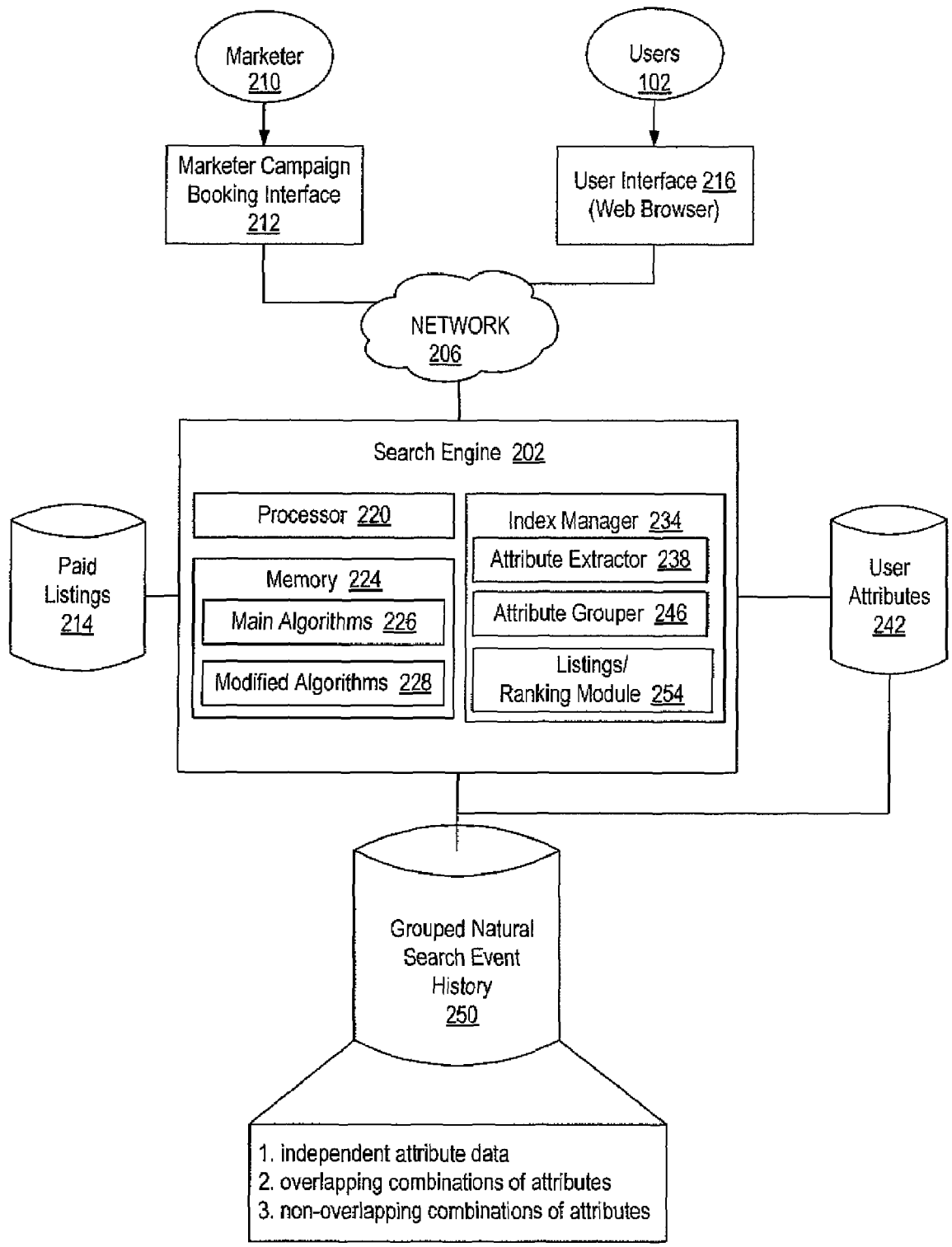
FIG. 2 is an exemplary block diagram of a search engine and related storage for implementing the system of FIG. 1 within the larger context of a network such as the Internet.

FIG. 2 is an exemplary block diagram 200 of a search engine 202 and related storage for implementing the system of FIG. 1 within the larger context of a network 206 such as the Internet. The search engine 200 of system 100 provides for automatically identifying which attributes 104 an online marketer 210 should use by analyzing the attributes 104 of users 102 engaged in natural search activity, otherwise known as algorithmic search activity. To do this analysis, the attributes 104 are first be extracted (or otherwise collected) and stored as discussed below.

When the marketer 210 accesses the search engine 202 to decide on a marketing campaign, and optionally bid on pay-per-click search terms, it is through a marketer campaign booking interface 212, which is typically set up as a web page of the publisher. Pay-per-click search terms are associated with relevant Uniform Resource Locators (URLs), or website links, of the marketer's various web pages 114. Pay-per-click listings are stored in a database 214, which usually also include ad copy related to the web page 114 to provide relevant, yet enticing or interesting information about the web page 114. Users 102 access the search engine 202 through a user interface 216 such as a web browser. Clicking on a URL link on a page of search results will take the user 102 to a marketer's web page 114, and if it is an unpaid listing, will begin to create a history of collectable natural search click events as described above. As will be seen, this history can be collected, stored, and tracked according to individual users, or grouped together and analyzed as a group for various markets or segments defined by one or more attributes.

The search engine 202 includes a processor 202, a memory 224 containing, inter alia, main algorithms 226 such as matching, targeting, and marketer algorithms 226, and modified algorithms 228 of each if they exist, and an index manager 234. The index manager 234 manages the listings of search results, including those sponsored by marketers 210, and includes an attribute extractor 238 to extract the attributes 104 from natural search activity, such as by communicating with a web beacon of a web page 114 of the marketer 210. Once attributes 104 are extracted or collected from users 102, whether for clickers or for non-clickers, they are stored in a user attribute database 242. The difference between a clicker and a non-clicker is whether a URL or other web page link in a set of search engine results was actually clicked by the user 102 ("a clicker") to drill down to the URL of a marketer 210 listed therein. This initial web page access is also referred to as an "impression," which is used in tracking advertising success metrics such as cost per impression (CPM) and click-through rates. These and other success matrices can be further tracked as the user 102 browses to access further sub-pages of a URL.

The index manager 234 farther includes an attribute grouper 246 to group attributes 104 according to whether combinations of attributes 104 are deemed overlapping or non-overlapping, and some are left in individual attribute 104 categories. Grouped user attributes 106 are then stored in a database 250 of grouped natural search event history. One of skill in the art will appreciate that databases 214, 242, and 250 may be a single database, may be distributed across the network 206, and may optionally be local to the search engine 202.

The index manager 234 further includes a listings and ranking module 254 to list and rank search results for display to a user 102 searching for a particular keyword search term. The listings include URLs that are linked to the search terms in the paid listings database 214, which also include ads for the URLs so that the searchers 102 know the general subject matter of the destination web page 114. The listings and rank module 254 by default uses the main algorithms 226 in memory 224 to produce a ranked list of search results for a search term. Ranked highest in the search results include the highest bidding sponsored ads and/or URLs from the paid listings database 214, in addition to the most relevant unpaid listings as determined by the main and modified algorithms 226, 228. The main algorithm 226 includes a matching algorithm that bases its relevancy, and thus ranked order, on at least the content of the web page 114 connected to the URL and/or to the associated ad displayed with the search results in a query results page.

Reference to "ads" or URL content as referred to herein may include the relevancy of META tags that are known to be used in search engine optimization, and thus affect the ranking of web pages 114 having different keywords or description therein. Indeed, the META tag description field of a web page will often be used as the ad content displayed in a search engine results page for unpaid websites 114, e.g. to provide a description of natural search results. Otherwise, META tags are usually invisible to the searcher 102, but still often used to rank web pages 114. The main algorithms 226 may also include a targeting algorithm to target any natural search history information acquired, for instance during the current session, to further match the ranking of the listing results to the specific user 102.

If, however, user attributes exist in the database 242 or stored groups of user attributes exist in the database 250 that relate to the keyword search term, a modified algorithm 228 may be executed by the listings and ranking module 254 to perform URL content and/or ad search term matching. Thus, the search engine 202 may use a modified matching algorithm that incorporates overlapping or non-overlapping grouped attributes from the database 250, discussed in detail with reference to FIG. 4. And, further, the search engine 202 may use a modified targeting algorithm that incorporates stored history of a specific user 102 doing the searching as found in the user attribute database 242, discussed in detail with reference to FIG. 3. The targeting algorithm, therefore, seeks to incorporate the specific tastes or preferences of a user 102 as determined by past natural search history of that user 102.

One of skill in the art will appreciate that main and modified matching and targeting algorithms 226, 288 may be integrated into respective main and modified matching algorithms 226, 228. In addition, there may be only a single algorithm 226 or 228 used that has the option to incorporate various aspects of stored user attributes found in databases 242 and 250 if relevant to a keyword term being search for by a user 102. One of skill in the art will also appreciate that the processor 220 may be combined with the index manager 234, and may process portions of software code to implement functions of both.

The processor 220 analyzes the stored one or more attributes 104 for both clickers and non-clickers for a search term to determine at least one factor between the clickers and non-clickers of the searchers 102 for that term that distinguishes them the most. The listings and ranking module 254 may then incorporate this at least one greatest distinguishing factor by use of a modified algorithm 228 to adjust (or re-rank) the order in which the listings are displayed to the searcher 102. The manner in which a modified algorithm 228 is employed to enhance the relevancy of listings displayed by the listings and rank module 254 based on stored attributes 104 or groups of attributes 106 is discussed in more detail in FIGS. 5 to 7.

Furthermore, the attribute grouper 246 uses the at least one greatest distinguishing factor to come up with segments within the clickers that would be useful to a marketer 210 to augment and enhance an online optimization campaign. Click-through rates or other success metrics may be collected on these various segments to be presented to the marketer 210 or otherwise used in optimizing the marketer's campaign. For example, success metrics related to grouped segments may help the marketer 210 to make a more informed choice in regards to bidding on search terms to which the segments relate if those segments hold special significance to the target market of the marketer 210, or may allow the marketer 210 to restrict the scope of coverage of a marketing campaign to specific segments or portions thereof.

Figure 3:
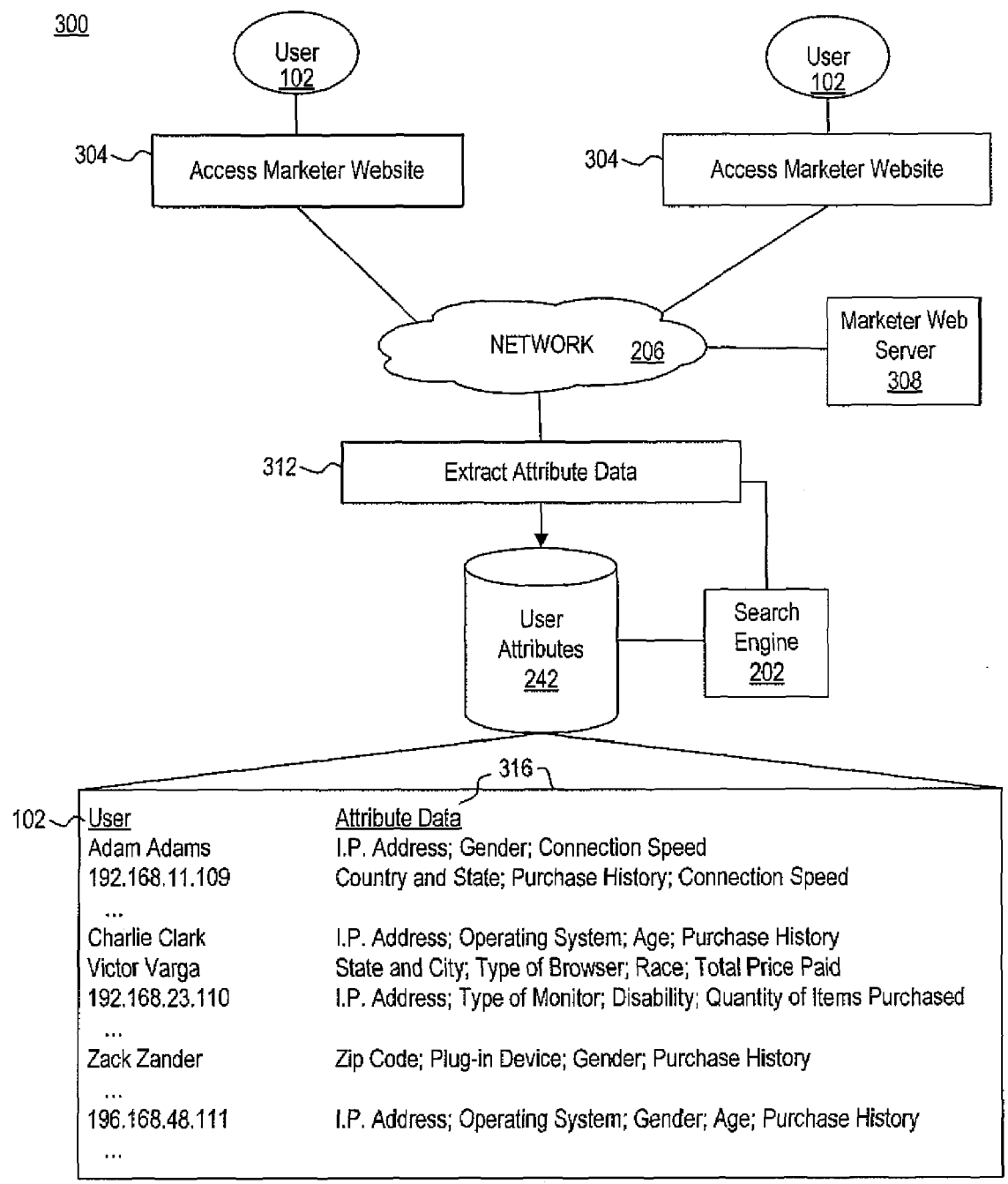
FIG. 3 is an exemplary block diagram showing one aspect of the search engine of FIG. 2 that is capable of extracting and storing attribute data from natural search events.

FIG. 3 is an exemplary block diagram 300 showing one aspect of the search engine of FIG. 2, which is capable of extracting and storing attribute data from natural search events created by the users 102. The users 102 access 304 marketer web pages 114 through marketer web servers 308 over the network 206, such as the Internet. The search engine 202 connects to the web pages 114 and extracts 312 or otherwise collects 312 attribute data from natural search activity conducted by users 102, both clickers and non-clickers. As discussed, this may be accomplished by a web beacon that communicates user browser activity and information, together with attribute data 316 composed of attributes 104, back to the search engine 202 for storage in the user attribute database 242. The attribute data 316 in the database 242, as shown, may be stored under a person and/or Internet Protocol (I.P.) address. Common natural search attributes 104 may thus also be collected through cookies and through I.P. address resolution, among other methods.

Examples of attributes 104 thus extracted from searchers 102, as shown, include geography, such as the country, state, city, and/or zip code where the searcher 102 is browsing from. This type of information is often attainable through resolution of the user's I.P. address. Further examples of attributes 104 include a technographic of a user's system used to access a marketer's web page 114. Technographics include, for example, connection speed, type of browser, size or quality of a monitor, an operating system, and a plug-in of a connection device (not shown) used by the searcher 102. This type of information would be indicative of, inter alia, how serious of a computer or online user the searcher 102 is based on how up-to-date or expensive his or her computer system and connection are. Further examples of attributes 104 include demographics, such as age, gender, race, and disability. Attributes 104 may also include a purchasing history of a searcher 102, which includes such information as a quantity purchased, a price paid per item, and a total price paid, either per visit or over a time period of multiple visits to a web page 114. As collected in mass, and stored in the database 242, attributes 104 become attribute data 316.

FIG. 4 is an exemplary block diagram 400 showing another aspect of the search engine 202, which is capable of grouping the extracted attributes 104 into segments of attribute categories or types of attributes. For instance, natural search user attributes 104 are collected in the user attribute database 242, which are then grouped 404 by the attribute grouper 246 of the search engine 202 into segments based on at least one greatest distinguishing factor between the clickers and non-clickers of searchers 102. These segments of information, along with independent attribute data 316 aggregated from database 242 and categorized into separate types of attributes, are stored in the grouped natural search event history database 250. As shown, at least two sets of segments are delineated by combinations of attributes that are overlapping 420 and those that are non-overlapping 424.

Examples of overlapping attributes 420 include all users 102 in a state having a particular gender, as there will always be females and males in all states. Another segment that may be added to the latter includes a sport that users 102 are interested in, despite the fact that some sports attract much more attention from one gender than another. Another example includes a large United States (U.S.) city and a race because most races are usually represented in large U.S. cities. Because there are so many searchers 102 using the Internet throughout the world, most categories of attribute data 316 will have some overlap with another category.

There are some categories of attribute data 316, however, that are non-overlapping 424, and may include all males in California together with all females in California. Another example may include all Hispanics in Alaska together with all Hispanics in Florida, because of the distance and varied geography, creating a very strong mutually exclusive group. Under a similar theory, another non-overlapping segment 424 may include all males in Europe together with all males in the U.S. These are non-exhaustive examples of segments, and many more may be thought of or created for the purposes of enhancing online marketing campaigns for marketers 210. The segments may be tracked in terms of click-through rates (or other success metrics) affiliated therewith.

Figure 5:
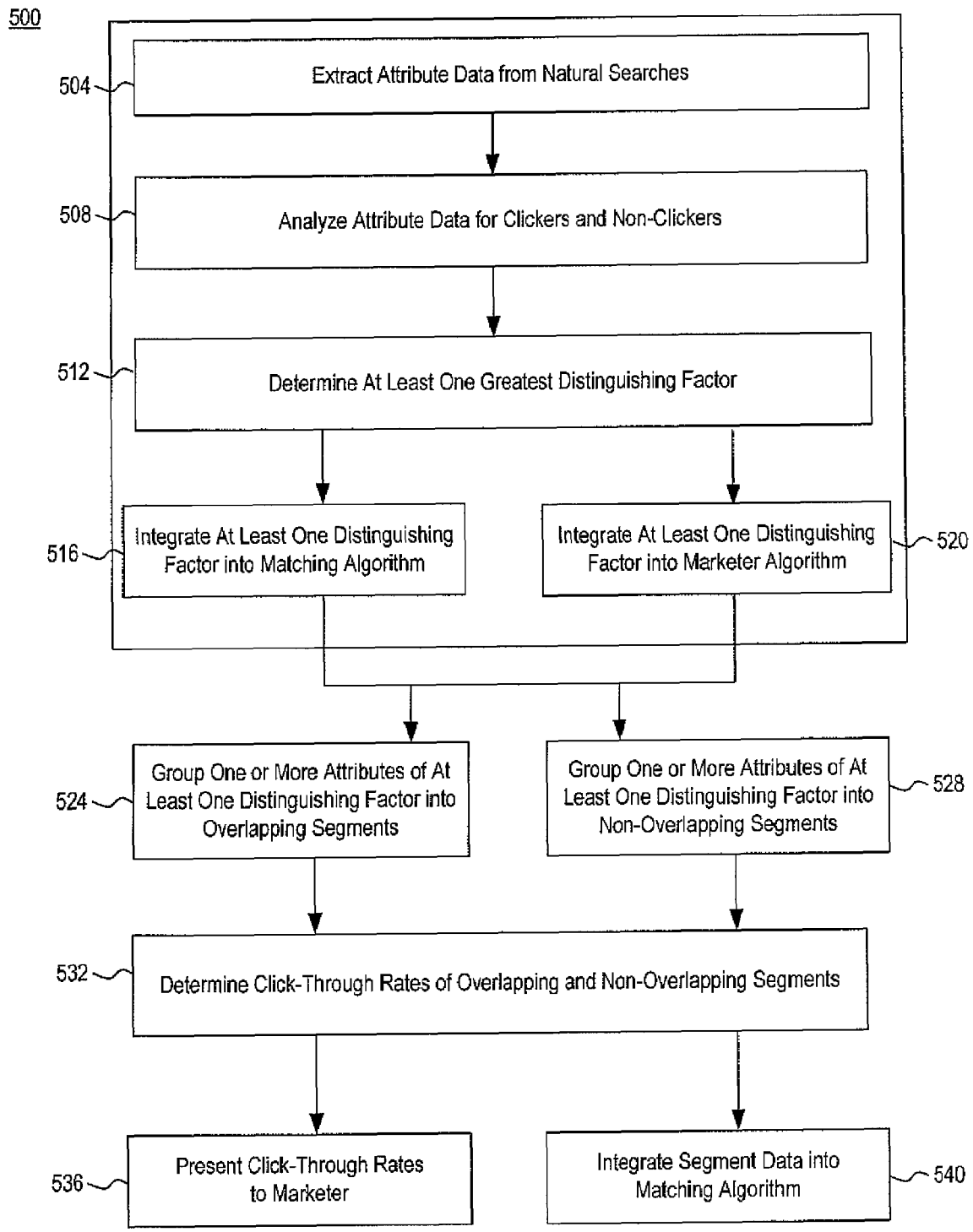
FIG. 5 is a flow chart of an exemplary method for augmenting marketing campaigns with natural search events.

FIG. 5 is a flow chart 500 of an exemplary method for augmenting marketing campaigns with natural search events. First, attribute data 316 may be extracted at 504 by the search engine 202 from a plurality of natural searches for a search term that is linked to a plurality of URLs. A search engine 202 analyzes, at step 508, the attribute data 316 of both clickers and non-clickers. The search engine 202 then determines, at step 512, at least one greatest distinguishing factor between the clickers and the non-clickers. The at least one greatest distinguishing factor is then integrated, at step 516, into a matching algorithm 228 used by the search engine 202 to rank order and display a plurality of the most relevant ads corresponding to the plurality of URLs in response to a search for the term. Furthermore, the at least one distinguishing factor may be integrated, at step 520, into a marketer algorithm 228 used by the search engine 202 to enable a marketer 210 of at least one URL to strategically choose the search term, along with the at least one greatest distinguishing factor, on which to bid. In addition, the URLs themselves may be used in being ranked according to relevancy the content of the web pages 114 linked from the URLs.

In addition to the above integration steps at steps 516 and 520, the search engine 202 may group, at step 524, the one or more attributes 104 having at least one greatest distinguishing factor to identify one or more overlapping segments 420 of clickers. Likewise, the search engine 202 may group, at step 528, the one or more attributes 104 of the at least one distinguishing factor into non-overlapping 424 segments of clickers. The search engine 202 may then determine, at step 532, the click-through rates (or other success metrics) of overlapping and non-overlapping segments 420, 424. Finally, the search engine 202 may present the click-through rates, at step 536, to a marketer 210 to help the marketer 210 to optimize an online campaign as discussed. The search engine 202 may also integrate segment data from steps 524 and 528 into the matching algorithm 228 to help automatically match relevant ads to a specific searching user 102 based on the at least one distinguishing factors. The later is possible because the search engine 202 is in communication with the user attributes database 242 in which specific attributes remain associated with specific users 102, and which may be mapped to strongly associated segments from steps 524 to 532.

Figure 6:
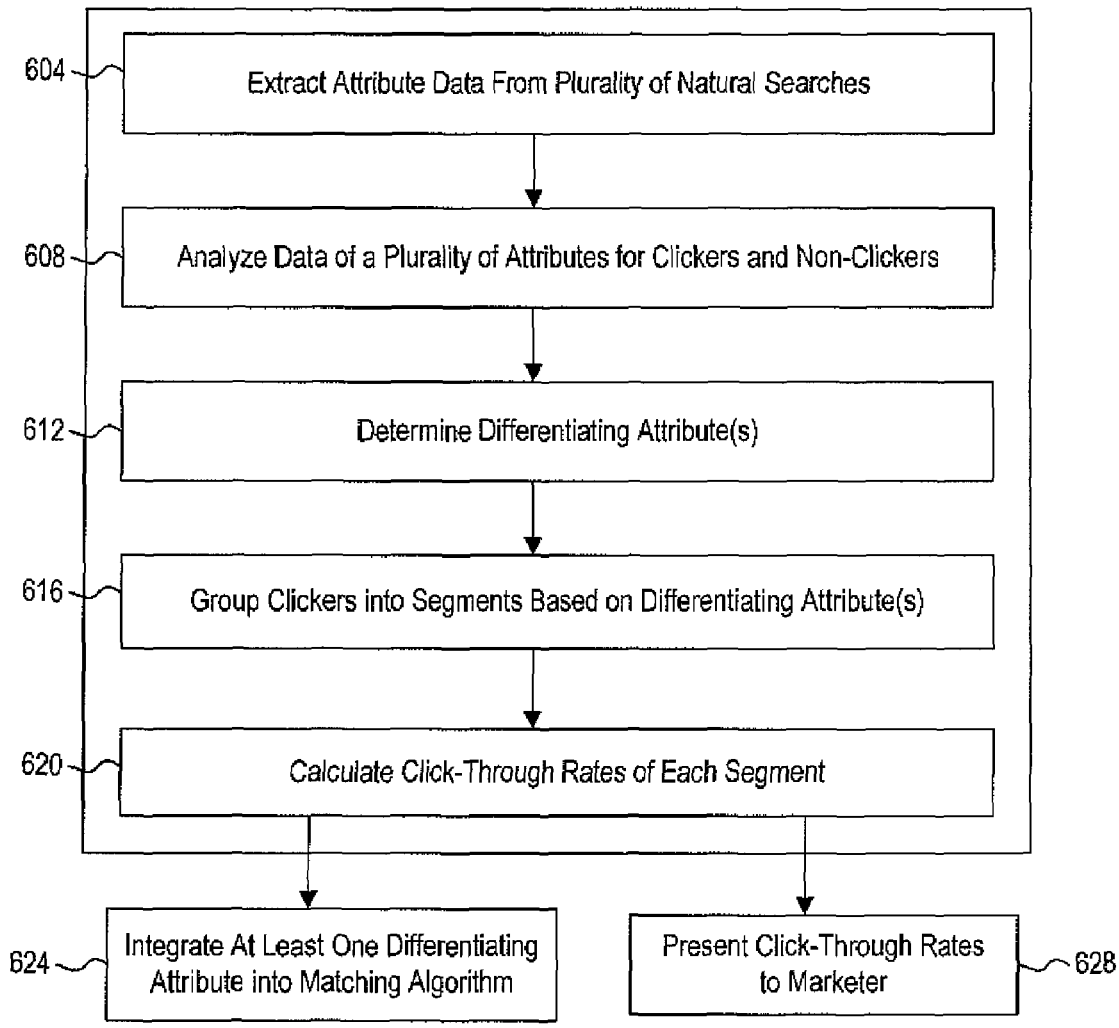
FIG. 6 is a flow chart of another exemplary method for augmenting marketing campaigns with natural search events.

FIG. 6 is a flow chart 600 of another exemplary method for augmenting marketing campaigns with natural search events. At step 604, a search engine 202 extracts or otherwise collects attribute data 316 from a plurality of natural searches for a search term associated with a plurality of URLs. The search engine 202 then analyzes, at step 608, the data 316 of a plurality of attributes 104 for both clickers and non-clickers.

At step 612, the search engine 202 determines at least one differentiating attribute as between the clickers and the non-clickers. At step 616, the search engine 202 then groups the clickers into segments based on the at least one differentiating attribute. The search engine 202 calculates click-through rates of each segment to be associated therewith. Additionally, the search engine 202 may integrate, at step 624, the at least one differentiating attribute into a matching algorithm 228 used by the search engine 202 to order rank and display at least one of the most relevant URL results and the most relevant ads corresponding to the plurality of URLs in response to a search for the term. Finally, at step 628, the click-through rates may be presented to a marketer 210 to improve campaign optimization when the marketer 210 decides whether to bid on a term having included therewith a related segment.

Figure 7:
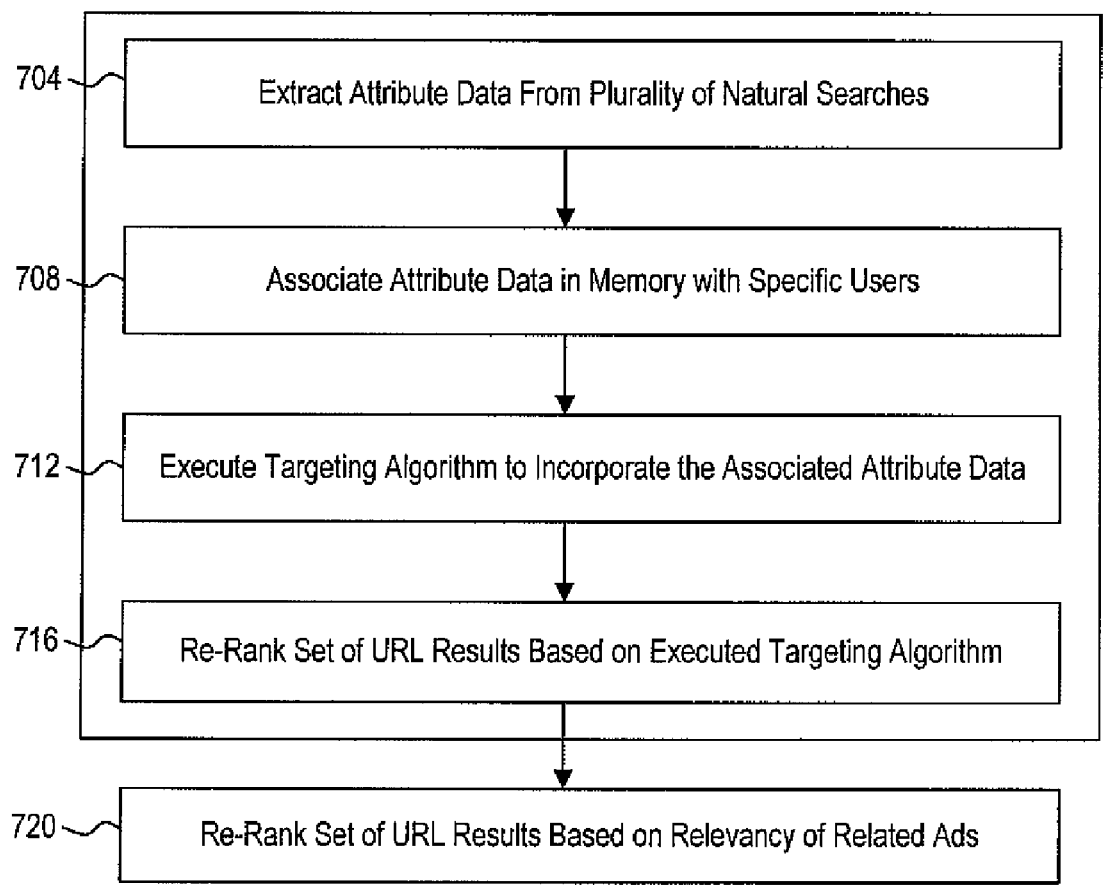
FIG. 7 is a flow chart of another exemplary method for augmenting marketing campaigns with natural search events.

FIG. 7 is a flow chart 700 of an exemplary method for augmenting marketing campaigns with natural search events. First, attribute data may be extracted at 704 by the search engine 202 from a plurality of natural searches for a search term that is linked to a plurality of URLs. A search engine 202 associates, at step 708, the attribute data in memory (such as in user attributes database 242) with specific users 102 that conducted the natural searches. The search engine 202 executes, at step 712, a targeting algorithm 228 that incorporates the associated attribute data for a user 102 performing a search for a search term. And, at step 716, the search engine 202 re-ranks a set of URL results based on the executed targeting algorithm 228 before being displayed to the user 102. The search engine may also, at step 720, re-rank the set of URL results based on the relevancy of a plurality of ads corresponding to the URLs as determined by the targeting algorithm. Note, as indicated before, that the targeting and matching algorithms may be combined into a single algorithm, so that although FIGS. 5 and 6 mention matching algorithms and FIG. 7 mentions a targeting algorithm does not mean that the two algorithms are mutually exclusive.

While specific embodiments and applications of various methods and systems for conducting experiments over the Internet have been illustrated and described, it is to be understood that the disclosure claimed hereinafter is not limited to the precise configuration and components disclosed. Various modifications, changes, and variations apparent to those of skill in the art may be made in the arrangement, operation, and details of the methods and systems disclosed.

The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

What is claimed is:

1. A computer-implemented method for augmenting sponsored search results in a search engine having a processor and storage, the method comprising:
   extracting user attribute data by the search engine from a plurality of natural searches executed previously by a plurality of users for a search term that is linked to a plurality of uniform resource locators (URLs);
   analyzing, by the search engine, the attribute data of one or more attributes for both clickers and non-clickers to determine at least one greatly distinguishing factor between the clickers and non-clickers for the one or more attributes;
   grouping, by the search engine, the one or more attributes having at least a greatest distinguishing factor to identify one or more non-overlapping segments of clickers; and
   in response to a search by a searching user for the term, integrating, by the search engine, the at least one greatest distinguishing factor into a matching algorithm to rank, order, and display a plurality of the most relevant ads corresponding to the plurality of URLs based on the aggregate of non-overlapping segments, wherein the plurality of most relevant ads have the highest aggregate of non-overlapping segment data matching the searching user.

2. The method of claim 1, further comprising:
   integrating the at least one greatest distinguishing factor into a marketer algorithm used by the search engine to enable a marketer of a URL to strategically choose a search term, along with the at least one greatest distinguishing factor, on which to bid.

3. The method of claim 1, wherein the one or more attributes comprise user geography.

4. The method of claim 3, wherein the at least one greatest distinguishing factor comprises one or more selected from the group consisting of country, state, city, and zip code.

5. The method of claim 3, wherein the user geography is determined from internet Protocol (I.P.) addresses of users executing the natural searches.

6. The method of claim 1, wherein the one or more attributes comprise a user technographic, and the at least one greatest distinguishing factor comprises one or more selected form the group consisting of a connection speed, a type of browser, a size or quality of monitor, an operating system, and a plug-in of a connection device used by the user.

7. The method of claim 1, wherein the one or more attributes comprise a user demographic, and the at least one greatest distinguishing factor comprises one or more selected from the group consisting of age, gender, race, and disability.

8. The method of claim 1, wherein the one or more attributes comprise an aspect of user purchasing history, and the aspect of user purchasing history comprises one or more selected from the group consisting of a quantity purchased, a price paid per item, and a total price paid.

9. The method of claim 1, further comprising:
   integrating the at least one greatest distinguishing factor into a marketer algorithm used by the search engine to suggest the search term to a marketer of a URL, along with the at least one greatest distinguishing factor, on which to bid.

10. A computer-implemented method for augmenting sponsored search results in a search engine having a processor and storage, the method comprising:
    extracting user attribute data by the search engine from a plurality of natural searches executed previously by a plurality of users for a search term that is associated with a plurality of uniform resource locators (URLs);

analyzing, by the search engine, the data of a plurality of attributes for both clickers and non-clickers to determine at least one attribute that greatly differentiates clickers from non-clickers;

grouping, by the search engine, the clickers into different segments based at least on a greatest differentiating attribute;

identifying, by the search engine, one or more overlapping segments and non-overlapping segments;

calculating, by the search engine, relative click-through rates of each respective group based on the identified one or more overlapping and non-overlapping segments; and presenting, by the search engine, a bidding interface that displays an optimum set of relative click-through rate results for each respective group based on the aggregate of one or more overlapping and non-overlapping segments.

11. The method of claim 10, further comprising:
integrating the at least one differentiating attribute into a matching algorithm used by the search engine to rank order and display at least one of the most relevant URL results and the most relevant ads corresponding to the plurality of URLs in response to a search for the term.

12. The method of claim 11, wherein the at least one differentiating attribute comprises one or more selected form the group consisting of a user geography, a user technographic, a user demographic, and a user purchasing history.

13. A computer-implemented method for augmenting sponsored search results in a search engine having a processor and storage, the method comprising:

extracting user attribute data, by the search engine, from a plurality of natural searches executed previously by a plurality of users for search terms that are linked to a plurality of uniform resource locators (URLs) and from web pages browsed by the plurality of users;

associating, by the search engine, the attribute data in memory with the specific users that conducted the natural searches and performed the web page browsing;

analyzing, by the search engine, the attribute data of one or more attributes for both clickers and non-clickers to determine at least one greatest distinguishing factor between the clickers and non-clickers for the one or more attributes;

grouping, by the search engine, the one or more attributes having the at least one greatest distinguishing factor to identify one or more overlapping segments of clickers;

integrating, by the search engine, the one or more overlapping segments of clickers into a matching algorithm used by the search engine to rank, order, and display a plurality of the most relevant ads corresponding to the plurality of URLs in response to a search for the search term;

executing, by the search engine, a targeting algorithm that incorporates the associated attribute data for each specific user that performed a search for a search term; and re-ranking, by the search engine, a set of URL results based on the executed targeting algorithm and matching algorithm before displaying the results.

14. The method of claim 13, wherein the matching algorithm includes the targeting algorithm.

15. The method of claim 13, wherein the attribute data comprises one or more selected form the group consisting of a user geography, a user technographic, a user demographic, and a user purchasing history.

16. A computer-implemented system for augmenting sponsored search results in a search engine, the system comprising:

an index manager to extract user attribute data from a plurality of natural searches performed previously by a search engine on behalf of users for a search term that is linked to a plurality of uniform resource locators (URLs);

a database, in communication with the index manager, to store the extracted attribute data, wherein the database comprises user attributes associated in memory with specific users that performed the natural searches and aggregates of the user attributes grouped by type of attribute, wherein the database is stored in memory storage coupled with the search engine; and a processor in communication with the database to:
analyze the user attributes for both clickers and non-clickers to determine at least one attribute that greatly differentiates clickers from non-clickers;

group the clickers into one or more overlapping segments based at least on a greatest differentiating attribute;

store the groups of clickers and overlapping segments in the database; determine the relative click-through rates of the one of more groups of clickers based on the one or more overlapping segments; and match a relevant ad or URL to a search user by aggregating the user attributes of the one or more overlapping segments.

17. The system of claim 16, wherein the memory storage includes a matching algorithm, wherein the processor integrates the at least one differentiating attribute into the matching algorithm used by the search engine to rank order and display the most relevant URL or ad results in response to a search for the term.

18. The system of claim 16, wherein the memory storage includes a marketer algorithm, wherein the processor integrates the at least one differentiating attribute into the marketer algorithm to enable a marketer of at least one URL to choose a strategic search term, along with the at least one differentiating attribute, on which to bid.

19. The system of claim 16, wherein the memory storage includes a targeting algorithm, wherein the processor:
executes the targeting algorithm that incorporates the associated attribute data for an identified user performing a search for a search term; and re-ranks a set of URL results based on the executed targeting algorithm before being displayed to the identified user.

20. The system of claim 16, wherein the attribute types comprise user geography, and the at least one differentiating attribute comprises one or more selected form the group consisting of country, state, city, zip code, and Internet Protocol (I.P.) address.

21. The system of claim 16, wherein the attribute types comprise a user demographic, and wherein the at least one differentiating attribute comprises one or more selected form the group consisting of age, gender, race, and disability.

22. The system of claim 16, wherein the attribute types comprise an aspect of user purchasing history, which comprises one or more selected form the group consisting of a quantity of items purchased, a price paid per item, and a total price paid.

23. The system of claim 16, wherein the attribute types comprise a user technographic, and wherein the at least one differentiating attribute comprises one or more selected from the group consisting of a connection speed, a type of browser, a size or quality of monitor, an operating system, and a plug-in of a connection device used by the user.

* * * * *

UNITED STATES PATENT AND TRADEMARK OFFICE
CERTIFICATE OF CORRECTION

PATENT NO. : 7,844,605 B2  Page 1 of 1
APPLICATION NO. : 11/738195
DATED : November 30, 2010
INVENTOR(S) : Joshua M. Koran It is certified that error appears in the above-identified patent and that said Letters Patent is hereby corrected as shown below:

In the Claims

In column 10, claim 6, line 43, before "the group consisting of" replace "form" with --from--.

In column 11, claim 12, line 24, after "or more selected" replace "form" with --from--.

In column 11, claim 15, line 60, after "one or more selected" replace "form" with --from--.

In column 12, claim 20, line 47, after "one or more selected" replace "form" with --from--.

In column 12, claim 21, line 52, after "one or more selected" replace "form" with --from--.

In column 12, claim 22, line 56, before "the group consisting of" replace "form" with --from--.

Signed and Sealed this
Eighteenth Day of June, 2013

Teresa Stanek Rea
*Acting Director of the United States Patent and Trademark Office*